(12) United States Patent
Goupil

(10) Patent No.: US 11,686,340 B2
(45) Date of Patent: Jun. 27, 2023

(54) CONNECTING DEVICE COMPRISING A BOLTED CLEVIS AND A DEFORMABLE RING IN THE CLEVIS

(71) Applicant: AIRBUS OPERATIONS (S.A.S.), Toulouse (FR)

(72) Inventor: Frédéric Goupil, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 254 days.

(21) Appl. No.: 17/104,225

(22) Filed: Nov. 25, 2020

(65) Prior Publication Data

US 2021/0163115 A1 Jun. 3, 2021

(30) Foreign Application Priority Data

Nov. 28, 2019 (FR) ...................................... 1913410

(51) Int. Cl.
*F16C 11/04* (2006.01)
*F16B 5/02* (2006.01)
*B64C 1/06* (2006.01)

(52) U.S. Cl.
CPC .............. *F16C 11/045* (2013.01); *B64C 1/06* (2013.01); *F16B 5/02* (2013.01); *Y10T 403/32861* (2015.01); *Y10T 403/32909* (2015.01)

(58) Field of Classification Search
CPC ................ F16C 11/045; F16C 11/0614; Y10T 403/32861; Y10T 403/32868; Y10T 403/32877; Y10T 403/32893; Y10T 403/32909; Y10T 403/32918; B64C 1/06; B64C 1/066; B64C 1/18
See application file for complete search history.

(56) References Cited

U.S. PATENT DOCUMENTS

| | | | |
|---|---|---|---|
| 1,954,277 A | | 4/1934 | Zerk |
| 2,346,574 A | * | 4/1944 | Guy ....................... B60G 11/12 267/270 |
| 2,659,619 A | | 11/1953 | Kishline et al. |
| 2,819,105 A | * | 1/1958 | Behnke ................. F16C 11/083 403/228 |
| 2,824,464 A | | 2/1958 | Remington |
| 3,085,773 A | * | 4/1963 | Anstrom et al. ....... B64D 27/26 248/555 |
| 3,215,384 A | * | 11/1965 | Chambers .............. B60G 9/003 267/67 |
| 4,062,637 A | * | 12/1977 | Allison .................... B62D 7/16 403/151 |
| 4,077,655 A | * | 3/1978 | Skahill .................. B60R 21/131 403/224 |

(Continued)

OTHER PUBLICATIONS

French Search Report for Application No. 1913410 dated Aug. 4, 2020.

*Primary Examiner* — Michael P Ferguson
(74) *Attorney, Agent, or Firm* — KDW Firm PLLC

(57) ABSTRACT

A device for fitting two components together by a clevis is improved by a seal including a deformable ring subjected to axial compression between one of the cheeks and a mobile washer which is brought closer to the cheek when a bolt passing through the clevis is tightened. This axial compression causes the rod to be clamped by the seal, eliminating all play and giving the assembly good cohesion while at the same time eliminating the transmission of vibration and noise.

22 Claims, 3 Drawing Sheets

(56) References Cited

U.S. PATENT DOCUMENTS

| | | | | |
|---|---|---|---|---|
| 4,139,245 A | * | 2/1979 | McCloskey | F16C 27/063 280/506 |
| 4,479,621 A | * | 10/1984 | Bergholz | B64C 1/18 244/118.1 |
| 4,684,280 A | * | 8/1987 | Dirkin | F16G 15/06 403/153 |
| 5,058,829 A | * | 10/1991 | Bentley | B64D 11/0696 244/122 R |
| 7,954,793 B2 | * | 6/2011 | Weisbeck | F16F 1/393 267/140.3 |

\* cited by examiner

CONNECTING DEVICE COMPRISING A BOLTED CLEVIS AND A DEFORMABLE RING IN THE CLEVIS

CROSS-REFERENCE TO RELATED APPLICATION

This application claims priority to French patent application FR 1913410 filed Nov. 28, 2019, the entire disclosure of which is incorporated by reference herein.

TECHNICAL FIELD

The subject of the disclosure herein is a connecting device comprising a bolted clevis and a deformable ring in the clevis.

Such devices can be used in the aeronautical field notably to fix the end of a strutting spacer or another slender component to another component such as a support structure, in order to transmit a load in the direction of extension of the spacer. Nonlimiting applications can be the attachment or support of floors, equipment, ventral fairings, or the like, to the structure of an aircraft, and, generally, all the couplings where there are plays to be eliminated.

BACKGROUND

A known device illustrated in FIG. 1 comprises a clevis 1, forming a female coupling, at the end of a first component 2 out of the two components to be assembled, for example the slender spacer. The clevis 1 is provided with two flat and parallel cheeks 3, each of which is passed through by a piercing 4, the piercings 4 being aligned and of the same radius. The first component 2 is assembled to a second component 5 of the assembly, which can be a plate 6 or another support structure, here at right angles to the first component 2 when the mounting is done, and which comprises a protruding coupling 7 comprising a piercing 8 and forming a male coupling with the clevis 1. The assembly is accomplished primarily by a bolt 9 with a head 10 and a tightening nut 11 that bear on the outer faces of the cheeks 3. A rod 12 of the bolt 9 passes through the piercings 4 and 8, which are then aligned. The assembly is completed by two bushings 13 and 14, both surrounding the rod 12 and of which the first 13 is disposed in the piercing 4 of one of the cheeks 3, and the other 14 is disposed in the piercing 4 of the other of the cheeks 3; the latter comprises, at one edge, a flange ring 15 protruding around its periphery.

A rigid mounting is obtained in the axial direction (X-X) of the rod 12 and of the alignment of the piercings of the bolt 9, the first bushing 13 being compressed between the coupling 7 and the head 10, and the second bushing 14 being compressed being the coupling 7 and the nut 9; furthermore, the flange ring 15 is compressed between the coupling 7 and the adjacent cheek 3, which ensures the position of the coupling 7 in that direction. It will also be noted that a ball joint 38 is incorporated in the coupling 7 to allow small adjustments of orientation of the first component 2 relative to the latter.

The compressed bushings 13 and 14 help to take up the axial plays in the assembly, but radial plays (in the radial direction R-R at right angles to the axial direction X-X) remain between the rod 12 of the bolt 9 on the one hand, and the ball joint 38 of the coupling 7 and possibly the bushings 13 and 14 on the other hand, even if the latter are compressed.

SUMMARY

One object of the disclosure herein is a connecting device of the kind mentioned, which is enhanced in this aspect: it is based primarily on the replacement of the bushings of the device described above with a seal that can better fill the gaps that can appear between the main components of the assembly. A better damping of vibrations and noise while the aircraft is in service can be expected. This seal is, moreover, of simpler construction, and it allows a simple and rapid mounting of the assembly, and some flexibility of adjustment of position or of orientation between the two components.

A general aspect of the disclosure herein is thus a connecting device between a first component, bearing a clevis with two cheeks provided with aligned piercings, and a second component with an end provided with a piercing, the device comprising, in a state of mounting of the connection, a bolt with a rod that passes through the piercings of the cheeks and the piercing of the end aligned between the piercings of the cheeks in an axial direction, the bolt being tightened on either side of the cheeks; and the device being characterized in that: a washer, bearing on the bolt, penetrates into the piercing of the first of the cheeks; and the device also comprises a seal which, in the connection state, is fixed in the piercing of the coupling, the seal comprises a deformable ring provided with a hole that is passed through by the rod of the bolt, the ring being tightened radially against the rod of the bolt and tightened axially between the washer and the second of the cheeks around the piercing of the second of the cheeks in the mounting state.

One important effect obtained in the mounting of the device is a compression of the deformable ring in its axial direction, which then produces an expansion in the radial direction, that can fill the radial gaps in the assembly, above all with the surface of the rod of the bolt. The seal provides a direct and firm link between the two components, by bearing with pressure on at least one of the cheeks and being tightly fitted into the piercing of the male coupling. It further tightens the rod of the bolt. The bushings in the piercings of the cheeks become unnecessary and are eliminated. Small relative movements between the two components remain possible to accept adjustments of position or of orientation, by virtue of the flexibility of the elastomer. The dynamic forces are not accompanied by significant noises or vibrations because of the damping obtained by the elastomer. The ball joint 38 becomes unnecessary. If the material of the ring is not very or not at all compressible (made of elastomer for example, incompressible), a moderate axial compression is sufficient to produce an adequate radial expansion.

Another aspect of the disclosure herein is a connecting assembly, capable of giving the above device in the mounted state, and comprising a spacer with two opposing ends, in which the spacer comprises, at at least one of the ends, a clevis with two parallel cheeks provided with piercings that are aligned in an axial direction; wherein the assembly also comprises: an annular seal which comprises a deformable ring provided with a hole; a bolt with a rod that can pass through the hole of the ring and the piercings of the cheeks; a washer that can penetrate into the piercing of the first of the cheeks and on which the bolt can bear; the ring having a first axial end of smaller radius than the piercing of the first of the cheeks, and a second axial end of greater radius than the piercing of the second of the cheeks.

According to various optional aspects of the disclosure herein:

the ring comprises axial ends in alignment with an intermediate part of the ring in the axial direction, which protrude out of the coupling of the second component in the axial direction and which have cross-sections progressively flaring towards the intermediate part of the ring;

the cross-sections of the axial ends of the ring are rounded;

the ring has an approximately elliptical section in which the intermediate part is delimited by a radially inner cylindrical side that is rectilinear in the axial direction of the ring and a radially outer cylindrical side that is rectilinear in the axial direction of the ring, and the axial ends of the ring have apex circular lines which are nearer, in a radial direction, to the radially inner cylindrical side than the radially outer cylindrical side;

the ring has, in a free state, a length, in the axial direction, greater than a distance between the cheeks of the clevis;

the rod of the bolt has a smaller radius than a radius of the hole of the ring in a state of dismantling of the connection, in which the ring is not tightened against the washer;

the ring is made of an essentially incompressible material, particularly rubber or an elastomer;

the seal comprises a bushing surrounding the ring, to which the ring is fixed, and which is fitted without play in the piercing (18) of the coupling in the state of mounting of the device;

the bushing is provided with a flange ring protruding outward from an edge of the bushing;

the washer has a tapered outer edge, and the piercing of the first of the cheeks has a tapered edge of the same taper angle;

the piercing of a first of the cheeks has a greater radius than the piercing of a second of the cheeks;

the washer is separate from the bolt;

a head of the bolt bears/can come to bear on the washer.

Another aspect of the disclosure herein is an aircraft structure comprising the connecting device or assembly, according to the above.

BRIEF DESCRIPTION OF THE DRAWINGS

The disclosure herein will now be described in detail by a preferred embodiment thereof, in conjunction with the following figures.

DETAILED DESCRIPTION

Figure 1:
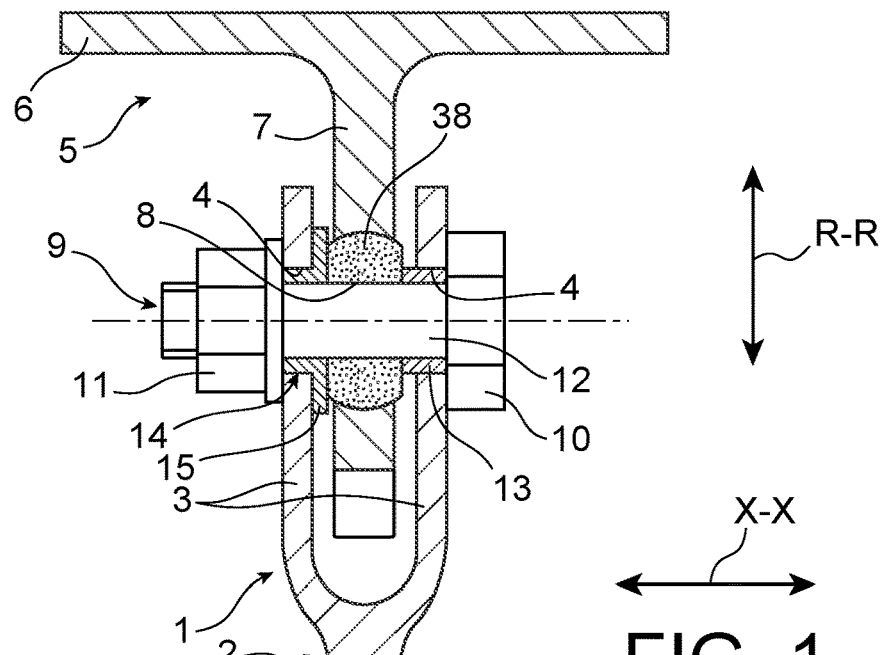
FIG. 1, already described, represents a known clevis connecting device, in cross section through the clevis.
Figure 2:
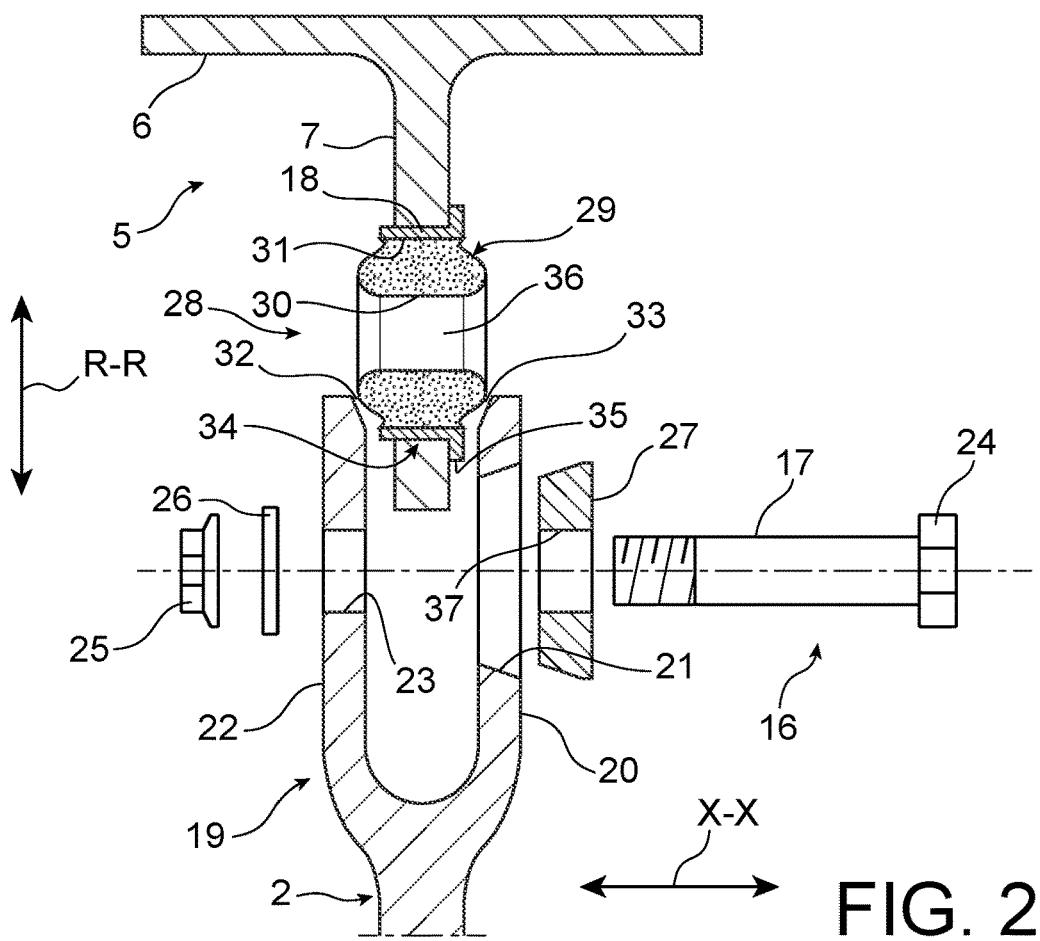
FIG. 2 represents an embodiment of the disclosure herein in the dismantled state, in cross section through the clevis.
Figure 6:
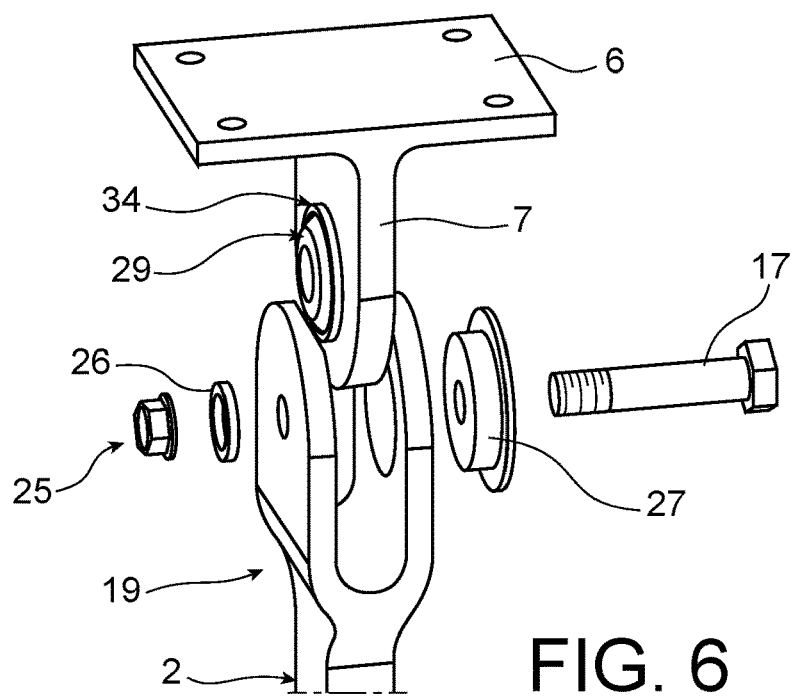
FIG. 6 is a view similar to that of FIG. 2, but in perspective.

The device of the disclosure herein is represented (FIGS. 2 and 6) for the same possible application as that of FIG. 1, by linking the components 2 and 5; the latter is, likewise, provided with a protruding coupling 7, but in which the piercing 18 is, here, straight and cylindrical and has no ball joint; and the clevis 1 with which the first component 2 is equipped is now replaced by a somewhat different clevis 19, in which a first cheek 20 bears a first piercing 21, and a second cheek 22, parallel to the preceding one, bears a second piercing 23, of smaller radius than the preceding one. Furthermore, the first piercing 21 has a tapered edge diminishing towards the interior of the clevis 19.

The assembly is then made by a bolt 16 comprising a rod 17, a head 24 at one end of the rod 17, and, at the other end thereof, which is threaded, a nut 25. The nut 25 is intended to bear on the outer face of the second cheek 22 via a washer 26; the head 24 is not however intended to bear on the first cheek 20, but on a washer 27 inserted into the first piercing 21, and the outer edge of which has a taper identical to the latter.

Also, the assembly further comprises a seal 28 comprising a main part which is a deformable ring 29, here made of elastomer, of a section here that is approximately elliptical and comprises an intermediate part 44, defined by a cylindrical radially inner side 30 and a cylindrical radially outer side 31 shorter than the preceding one, and two axial ends 32 and 33 at the ends of the intermediate part 44 and protruding in the axial direction of the seal 28, which coincides with the axial direction X-X already introduced and which is that of the rod (here 17) and of the alignment of the piercings (here 21 and 23). The axial ends 32 and 33 have rounded, approximatively half-circular cross-sections, and their contour is connected to the ends of the cylindrical sides 30 and 31. Other forms of the deformable ring would be possible, rounded sections at the longitudinal ends possibly being however preferred to facilitate a gradual tightening and an easier insertion into the clevis 19. Elastomer is a material that is appreciated here since it is not only deformable but incompressible, very elastic and offers good mechanical resistance to flattening, but other deformable materials, such as polymers and in particular thermoplastics, could be appropriate, depending on the mechanical or thermal stresses that the ring might have to withstand. The seal 28 also comprises an outer bushing 34 to which the ring 29 is fixed by the outer cylindrical side 31, and which is provided with a flange ring 35 at one end. The radially inner side 30 remains bare in order to contact the rod 17 directly. A central hole of the ring 29, which is surrounded by the radially inner side 30, bears the reference 36 and its length extends also in the axial direction X-X.

In a completely dismantled state of the device, which is not represented here, the seal 28 is free. A first mounting step consists in or comprises inserting it into the piercing 18 of the coupling 7. Since the bushing 34 has no play, or has a slight negative play, with the piercing 18, the fitting is done by press or by a similar means. The seal 28 is then fixed to the coupling 7, at an axial position determined by the abutment of the flange ring 35 against a flat lateral face of the coupling 7, and this position remains invariable.

Figure 3:
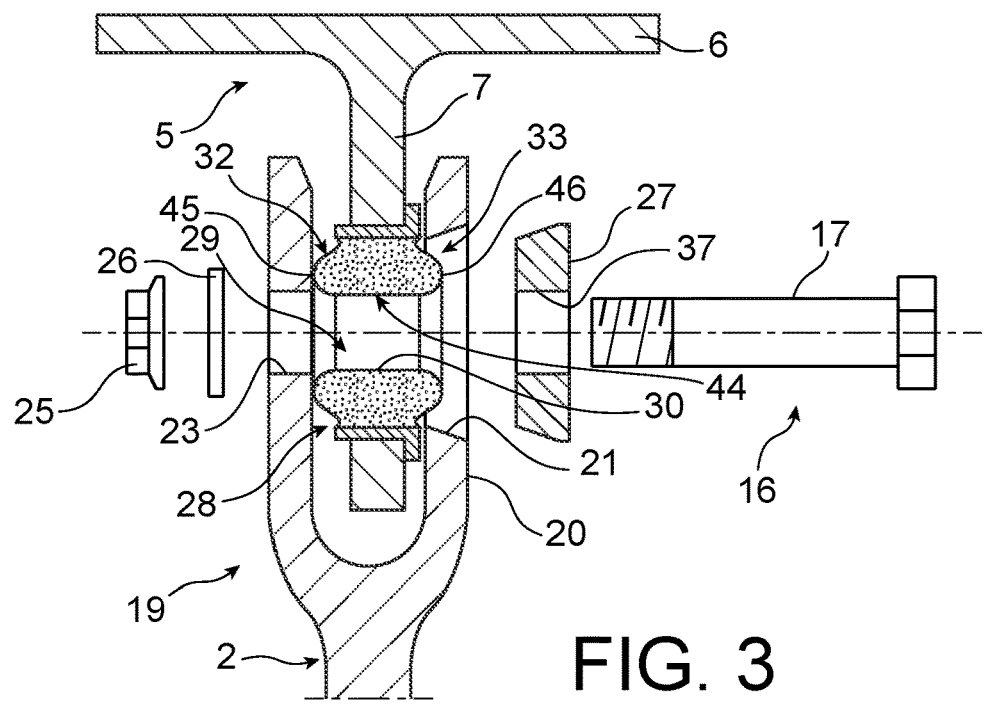
FIG. 3 represents an intermediate state of mounting of this embodiment in the same cross section.

The next mounting step consists in or comprises pushing the coupling 7 bearing the seal 28 into the clevis 19 to produce the alignment of the piercings 21, 23 and 18 and of the hole 36 at the centre of the ring 29 of the seal 28, to give the state represented in FIG. 3. The distance between the axial ends 32 and 33 in the axial direction X-X of the seal 28 is a little greater than the separation between the inner faces of the cheeks 20 and 22, which has not prevented the introduction of the seal 28, by virtue of the flexibility of the elastomer and the rounded form of the axial ends 32 and 33, by exerting a little force.

Figure 4:
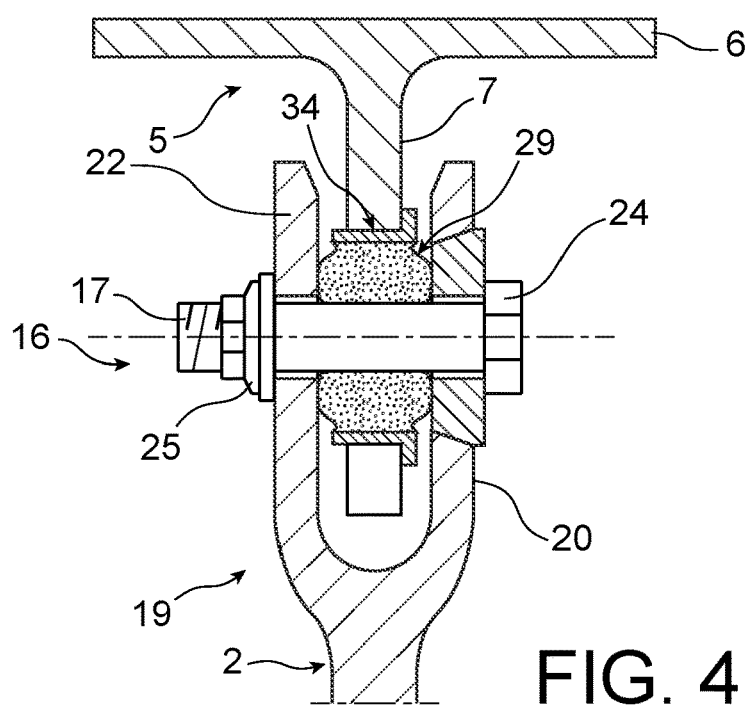
FIG. 4 represents the mounted state of this embodiment in the same cross section.

The final mounting step, giving the state of FIG. 4, consists in or comprises installing the bolt 16 and in tightening it. The rod 17 is threaded into the piercings 21, 23 and the hole 36 that are aligned, and also through a piercing 37 at the centre of the washer 27. The fitting has little clearance with the second piercing 23 and the piercing 37, and a slightly greater clearance with the hole 36 in the loosened state of the bolt 16. When the nut 25 is screwed, it bears via the washer 27 on the outer face of the second cheek 20 while the head 24 bears on the outer face of the washer 27 and presses it into the first piercing 21 until the tapered faces abut. The ring 29 of the seal 28 has then been compressed in the axial direction X-X between the washer 27 and the first cheek 20 by pushing back its axial ends 32 and 33, causing it to be expanded in the radial direction R-R. The radial expansion is exerted inward since it is prevented in the opposite direction by the present bearing, since the initial state, of the radially outer side 31 on the outer bushing 34. The ring 29 is therefore deformed to tighten the rod 17. It also produces a link that is firm and without clearance, but has some flexibility, between the clevis 19 and the coupling 7 via the tapered washer 27 and the outer bushing 34, which are respectively fixedly linked to them. The abutment of the tapered faces limits the tightening of the ring 29.

FIG. 4 shows that the axial compression of the elastomer between the second cheek 19 and the washer 27, combined with the compression of the elastomer tightening the rod 17, in the absence of clearance between the seal 28 and the piercing of the coupling 7, and with the modest amount of the clearances between the rod 17 and the piercings 23 and 37, gives a mounting without clearance and therefore that is particularly unlikely to allow dynamic vibration forces and shocks between the support 6 and the spacer 2, all the more so since elastomer has good damping properties, since it adapts to the tolerances of form or of dimension of the components of the assembly and since it also will absorb possible small movements of position or of orientation between the two components 2 and 5. Since the ring 29 is preferably incompressible (if, for example, it is made of elastomer) or almost incompressible, a moderate axial compression is sufficient to produce the sufficient radial expansion to tighten the rod 17.

It is now fitting to describe the mechanical phenomenon exploited by the disclosure herein more at length, that is a conversion of the axial compressive strains in the ring 29 into expanding, especially inwardly expanding, radial strains so that the rod 17 is tightened. A convenient degree of this conversion depends heavily on favorable factors of shape in the arrangement and particularly in the ring 29. We recommend that the ring 29 has an overall regular shape, without discontinuities of direction or thickness. The edges of the axial ends 32 and 33 join the intermediate part 44 at smooth junctions without sharp angles, like by progressively flaring thereto with a rounded shape. The intermediate part 44 extending between the axial ends 32 and 33 is cylindrical with a constant thickness and constant radius. This allows an alignment in the axial direction of the intermediate part 44 and the axial ends 32 and 33, thus in the tightening direction, and this also allows a transmission of uniform compressive efforts in the intermediate part 44 which has a uniform thickness. The axial ends 32 and 33 diffuse compressive strains at any thickness of the intermediate part 44, owing to the regular, almost half-circular, contour of their cross-section, and to the fact they do not abut on nor contact with neighbour parts, particularly the outer bushing 34 and the coupling 7, because the intermediate part 44 is longer than the outer bushing 34 and than the piercing 18 of the coupling 7. Let us also remark that the axial ends 32 and 33 have circular apex lines 45 and 46 with a radius closer to the radius of the radially inner side 30 than to the radially outer side 31, which enhances the inward radial expansion of the ring 29 when it is compressed.

All these characteristics contribute to obtaining a sufficient inward radial deformation of the ring 29 when it is compressed, guaranteeing a firm tight of the rod 17 for assemblies having current shapes and dimensions. This result would not be certain with any other elastic ring, especially those, frequently used in industry, having ends provided with flat collars abutting parts of the assemblies.

Another beneficial factor is related to incompressibility of the material, that is the capability to be compressed without volume change: rubber and generally elastomers, being perfectly or essentially incompressible, have the property of better converting the axial compressive strains into radial expanding strains, and they are therefore preferred for the making of the ring 29.

Figure 5:
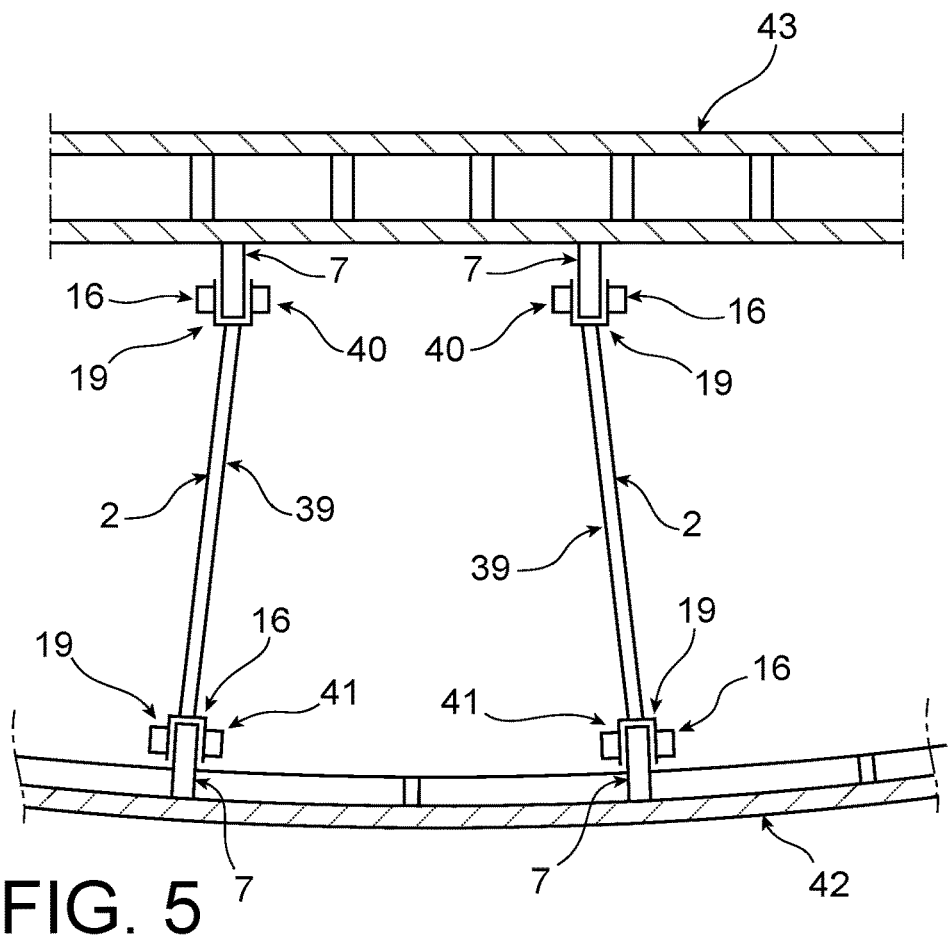
FIG. 5 represents a spacer according to the disclosure herein, in a partial cross section of an aircraft.

FIG. 5 more comprehensively illustrates another aspect of the disclosure herein: a spacer 39 composed, in addition to the first component 2, which is slender and straight, of two opposing ends 40, 41, of which at least one is equipped with the connecting device already described, notably comprising a clevis 19 equipped with a bolt 16. The parts linked by one or more spacers 39 and bearing male couplings 7 can be, for example, a stiffened structure 42 of an aircraft at the bottom and a floor 43 at the top; many other applications are possible, the duly constituted spacers 39 at their two ends being therefore able to be considered as link rods, that can transmit a possibly significant force in their direction of extension. The flexibility of the ring 29 notably allows a small misalignment between the hole 36 and the piercings 21 and 23 of the cheeks 20 and 22 of the clevis 19, by therefore taking up tolerances of position of the elements of the assembly and notably of length of the spacers 39. A mounting strain on the ring 29 is accepted, but is in principle low compared to the strains experienced in operation. Having to ensure the assembly through complicated measures such as counter-drilling of the clevis 19, or lengthwise adjustment of the spacer 39, will be much less commonplace than with the known designs.

The washer 27 could be incorporated in the bolt 16 by being made of a piece with the head 24. The ring 29 could be fixed to the coupling 7 by structure other than the bushing 34. It could have a section other than elliptical. The construction represented here is considered advantageous for the simplicity of production of the elements and of mounting of the device. Many variant designs or embodiments of the disclosure herein remain possible.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connecting device between a first component comprising a clevis with two opposing cheeks having aligned piercings, and a second component comprising a coupling disposed between the cheeks and having a piercing axially aligned with the piercings of the clevis, the connecting device comprising, in a connection mounting state:

an annular seal which is fixed in the piercing of the coupling, the seal comprising a deformable ring made of a deformable material with a hole axially aligned with the piercings of the clevis, and wherein the ring has, in a free state, an axial length greater than a distance between the cheeks of the clevis;

a washer inserted within the piercing of a first one of the cheeks on an outer side thereof, wherein the piercing of the first cheek has a tapered inner surface and the washer has an outer surface with a shape corresponding to the tapered inner surface, the corresponding outer surface of the washer bearing on the tapered surface of the first cheek, and the washer having a hole axially aligned with the hole of the ring; and a bolt comprising a rod which passes through the piercings of the cheeks and the coupling and the holes of the ring and the washer, and a head which bears on an outer surface of the washer, the bolt being tightened on an outer side of a second one the cheeks;

wherein, when the bolt is tightened, the head of the bolt compresses the washer against a first axial end of the ring, a second axial end of the ring is compressed against the second cheek, and a main portion of the ring is radially compressed against the rod of the bolt.

2. The connecting device according to claim 1, wherein the ring comprises axial ends in alignment with an intermediate part of the ring in the axial direction, which protrude out of the coupling of the second component in the axial direction and which have cross-sections progressively flaring towards the intermediate part of the ring.

3. The connecting device according to claim 2, wherein the cross-sections of the axial ends of the ring are rounded.

4. The connecting device according to claim 2, wherein the ring has an approximately elliptical section in which the intermediate part is delimited by a radially inner cylindrical side that is rectilinear in the axial direction of the ring and a radially outer cylindrical side that is rectilinear in the axial direction of the ring, and the axial ends of the ring have apex circular lines which are nearer, in a radial direction, to the radially inner cylindrical side than the radially outer cylindrical side; and wherein the radially inner cylindrical side substantially surrounds a portion of the rod of the bolt and the radially outer cylindrical side is configured to be coupled to the piercing of the coupling.

5. The connecting device according to claim 1, wherein the rod of the bolt has a smaller radius than a radius of the hole of the ring in a state of dismantling of connection, in which the ring is not tightened against the washer.

6. The connecting device according to claim 1, wherein the ring is made of a material comprising rubber or an elastomer.

7. The connecting device according to claim 1, wherein the seal comprises a bushing surrounding the ring, to which the ring is fixed, and which is fitted without play in the piercing of the coupling in the mounting state of the device.

8. The connecting device according to claim 7, wherein the bushing comprises a flange ring protruding outward from an edge of the bushing.

9. The connecting device according to claim 1, wherein the piercing of the first of the cheeks has a greater radius than the piercing of the second of the cheeks.

10. The connecting device according to claim 1, wherein the washer is separate from the bolt.

11. An aircraft structure comprising a connecting device according to claim 1.

12. A connecting assembly comprising a spacer with two opposing ends, in which the spacer comprises, at at least one of the ends:

a clevis with two parallel cheeks having piercings that are aligned in an axial direction, the cheeks being configured to receive therebetween a coupling of a second component having a piercing axially aligned with the piercings of the clevis;

an annular seal configured to be fixed in the piercing of the coupling, the seal comprising a deformable ring made of a deformable material having a hole axially aligned with the piercings of the clevis, and wherein the ring has, in a free state, an axial length greater than a distance between the cheeks of the clevis;

a washer inserted within the piercing of a first one of the cheeks on an outer side thereof, wherein the piercing of the first cheek has a tapered inner surface and the washer has an outer surface with a shape corresponding to the tapered inner surface, the corresponding outer surface of the washer bearing on the tapered surface of the first cheek, and the washer having a hole axially aligned with the hole of the ring; and a bolt comprising a rod that passes through the holes of the ring and the washer and the piercings of the cheeks, and a head which bears on an outer surface of the washer, the bolt being tightened on an outer side of a second one the cheeks;

the ring having a first axial end of smaller radius than the piercing of the first of the cheeks, wherein the first axial end is configured to engage the washer; and the ring having a second axial end of greater radius than the piercing of the second of the cheeks, wherein the second axial end is configured to engage the second of the cheeks;

wherein, when the bolt is tightened, the head of the bolt compresses the washer against the first axial end of the ring, the second axial end of the ring is compressed against the second cheek, and a main portion of the ring is radially compressed against the rod of the bolt.

13. The connecting assembly according to claim 12, wherein the ring comprises axial ends in alignment with an intermediate part of the ring in the axial direction, which protrude out of a coupling of a second component in the axial direction and which have cross-sections progressively flaring towards the intermediate part of the ring.

14. The connecting assembly according to claim 13, wherein the cross-sections of the axial ends of the ring are rounded.

15. The connecting assembly according to claim 13, wherein the ring has an approximately elliptical section in which the intermediate part is delimited by a radially inner cylindrical side that is rectilinear in the axial direction of the ring and a radially outer cylindrical side that is rectilinear in the axial direction of the ring, and the axial ends of the ring have apex circular lines which are nearer, in a radial direction, to the radially inner cylindrical side than the radially outer cylindrical side; and wherein the radially inner cylindrical side substantially surrounds a portion of the rod of the bolt, and the radially outer cylindrical side is configured to be coupled to a piercing of the coupling.

16. The connecting assembly according to claim 12, wherein the rod of the bolt has a smaller radius than a radius of the hole of the ring in a state of dismantling of the connection, in which the ring is not tightened against the washer.

17. The connecting assembly according to claim 12, wherein the ring is made of a material comprising rubber or an elastomer.

18. The connecting assembly according to claim 12, wherein the seal comprises a bushing surrounding the ring, to which the ring is fixed, and which is fitted without play in the piercing of a coupling in the state of mounting of the device.

19. The connecting assembly according to claim 18, wherein the bushing comprises a flange ring protruding outward from an edge of the bushing.

20. The connecting assembly according to claim 12, wherein the piercing of the first of the cheeks has a greater radius than the piercing of the second of the cheeks.

21. The connecting assembly according claim 12, wherein the washer is separate from the bolt.

22. An aircraft structure comprising a connecting assembly according to claim 12.

\* \* \* \* \*